Jan. 25, 1966   H. SCHENCK ETAL   3,231,366
METHOD AND APPARATUS FOR REDUCING IRON ORE AND THE LIKE
Filed Jan. 26, 1962   2 Sheets-Sheet 2
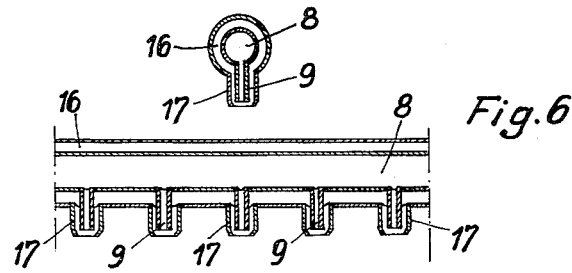
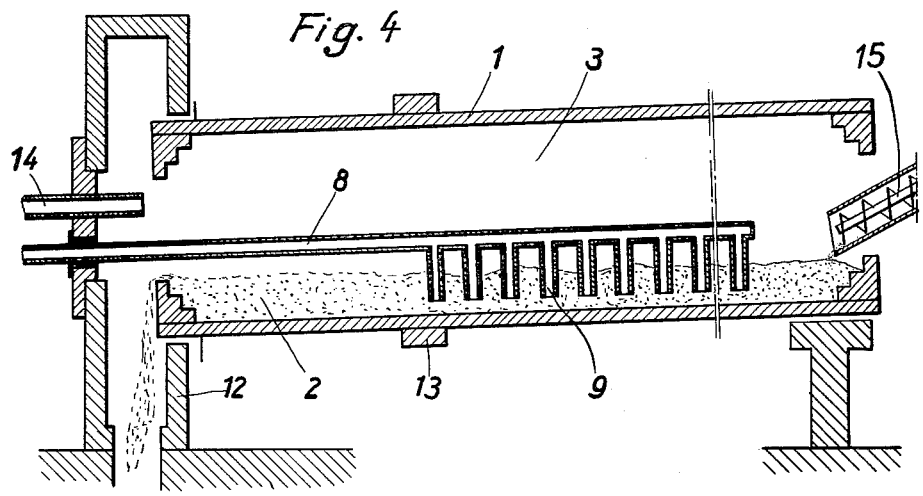
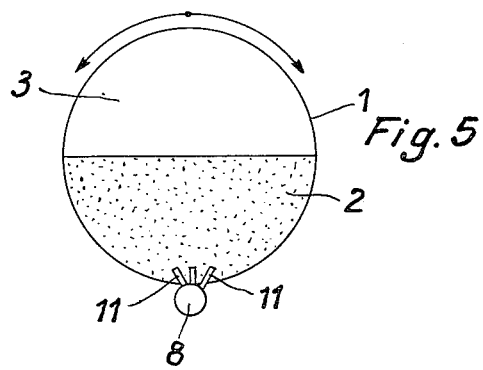
Inventors
Hermann Schenck
Werner Wenzel
by: Michael S. Striker
Attorney

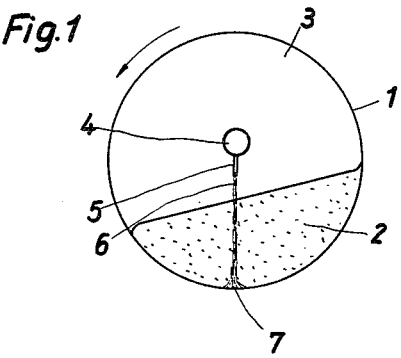
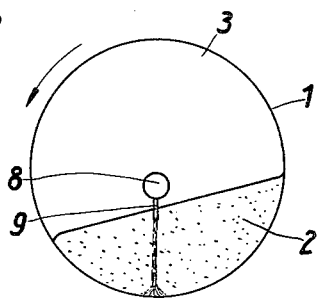
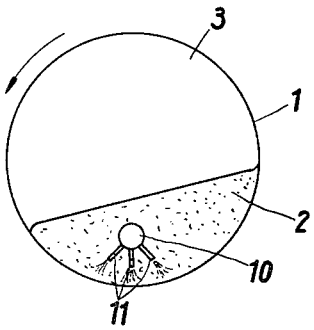

United States Patent Office 3,231,366
Patented Jan. 25, 1966

3,231,366
METHOD AND APPARATUS FOR REDUCING IRON ORE AND THE LIKE
Hermann Schenck and Werner Wenzel, Aachen, Germany, assignors to Rheinstahl Industrieplanung G.m.b.H., Essen, Germany
Filed Jan. 26, 1962, Ser. No. 168,891
Claims priority, application Germany, Jan. 31, 1961, R 29,567
10 Claims. (Cl. 75—26)

The present invention relates to a method and apparatus for reducing iron ore and the like, and more particularly to the reduction of iron ore in turnable furnaces by means of gaseous and liquid reducing agents.

The reduction of iron ore with gaseous and liquid reducing agents in revolving furnaces is connected with considerable difficulties since, up to now, it was not possible to achieve the desired intimate mixture of reducible ore and reducing agent. Gaseous reducing agents such as for instance may be formed of hydrocarbon oils at the reduction temperature in the furnace will be in contact with the iron ore for an insufficiently short period of time, so that the major portion of the thus formed reducing gases will be burned in the gas space of the revolving furnace, above the bed of ore which is to be reduced, or will escape without being utilized together with the waste gases.

It is therefore an object of the present invention to overcome the above discussed difficulties.

It is a further object of the present invention to provide a method and apparatus for reducing an ore and the like according to which sufficiently intimate mixing between the reducing agent and the ore will be achieved so that the ore reduction will be carried out in an economically feasible and technically effective manner.

Other objects and advantages of the invention will become apparent from a further reading of the description and of the appended claims.

The furnace which is used for reduction of ore in accordance with the present invention, essentially is a revolving or turntable furnace with horizontal or inclined axis. The term "turnable furnace" as used herein is to be broadly understood to include revolving furnaces which rotate about their axis in one and the same direction, as well as rocking or tilting furnaces which turn about their axis in one direction for, for instance, 100° and then reverse their direction of turning so that the furnace will turn to and fro for, for instance, 100° in each direction.

With the above and other objects in view, the present invention contemplates a method of reducing ore, comprising the steps of forming in a furnace turnable about its axis a bed of finely subdivided reducible ore particles adapted to be fluidized and filling the furnace but partly, turning the furnace so as to at least partially fluidize the bed of ore particles forming in the furnace an at least partially fluidized bed of reducible ore particles, and blowing into athe at least partially fluidized bed of reducible ore particles at least one stream of reducing agent which at least within the at least partially fluidized bed is in gaseous state, the reducing agent in gaseous state reducing the ore and simultaneously further fluidizing the at least partially fluidized bed.

The present invention also includes in a reducing device for reducing iron ore and the like, in combination, furnace means including a furnace turnable about its axis, means for forming in the furnace a bed of finely subdivided reducible ore particles adapted to be fluidized and filling the furnace but partly, so that upon turning of the furnace an at least partially fluidized bed of ore particles will be formed in the lower portion of the furnace, and blowing means extending into the furnace for blowing into the lower portion of the furnace at least one stream of a fluid reducing agent adapted to reduce the ore particles of the at least partially fluidized bed and simultaneously further fluidizing the same.

According to the present invention, the iron ore which is to be reduced is of such small particle size, preferably not exceeding 0.5 mm., that a fluidized bed of ore particles will be maintained due to the blowing of a reducing gas into the same or by the action of reducing gases which are formed in situ by the cracking of a suitable hydrocarbon oil.

Fluidized beds behave in many respects like liquids. Particularly, the interaction with respect to a stream of gas which is blown from above towards the fluidized bed, or with respect to a solid body passing through the fluidized bed, the latter acts as if it were a liquid. This characteristic behavior of fluidized beds is utilized according to the present invention.

According to one embodiment of the present invention, a rolling fluidized bed or at least partially fluidized bed is formed in the revolving furnace by charging the same with finely subdivided iron ore, such as iron ore having a particle size of 0.5 mm. or less. This initial fluidization occurs due to the fact that the turning or revolving of the furnace will continuously mix gas from the atmosphere in the uper portion of the furnace into and below the bed of small ore particles, so that the bed will react with respect to the rotation of the furnace somewhat like a liquid, namely under formation of a slightly inclined liquid-like bed surface.

In order to achieve this result, it is preferred that the fluidized bed of ore particles will occupy only about one-third of the furnace space. The thus-formed initial fluidized bed in the revolving or turning furnace will be heated in conventional manner by the combustion of gas or oil in the furnace space above the fluidized bed.

When, in this manner, the bed has reached a temperature which is sufficiently high for reducing of the iron ore particles, for instance a temperature of between 800 and 900° C., gas or oil is blown from above through one or more distributing conduits against the surface of the fluidized bed, in the form of fine streams or jets of high velocity. The gas or oil streams will penetrate deeply into the fluidized bed and by suitably controlling the velocity of the streams or jets of gas or oil which are blown into the fluidized bed, gas will reach the furnace wall below the fluidized bed will be deflected by the furnace wall and split into smaller streams within the fluidized bed.

Thus, it is possible to carry out the purpose of the present invention in conventional revolving or turning furnaces with horizontal or inclined axes, however, according to the present invention, a stationary conduit, which does not turn with the furnace, extends into the furnace substantially in axial direction of the same, is firmly supported outside of the furnace and serves for introducing the reducing gas or the hydrocarbon oil into the fluidized bed which occupies about one-third of the furnace space.

The gas which is thus blown into the at least partially fluidized mass of ore particles, or the gas which is formed of the oil which is blown into the mass, will cause a further loosening of the at least partially fluidized mass so as to improve the state of fluidization of the same and thus to make its behavior even more comparable with that of a liquid. By simply rotating or turning the furnace containing the mass of ore particles a relatively unstable or only partial fluidization of the mass of ore particles is achieved so that the flow conditions at this point are still quite imperfect. However, upon blowing a gas or oil into this initially at least partially fluidized mass, the same is changed to a truly fluidized bed which is characterized by its low resistance against penetration by the jet or stream of gas or liquid or by solid bodies. These qualities of the thus formed truly fluidized bed are utilized in the various embodiments of the present invention.

According to one of the embodiments of the present invention, the nozzles through which the reducing gas, or the hydrocarbon oil which upon cracking will form a reducing gas, is introduced will be located within, or will have their openings within the fluidized bed and not upwardly spaced from the same. The nozzle openings according to this embodiment preferably will be located within the fluidized bed in the vicinity of the lower inner wall portion of the revolving or turning furnace and, like the conduit to which these nozzles are attached and through which the reducing gas or hydrocarbon oil is fed to the nozzles, will be stationary so as not to participate in the revolving or turning movement of the furnace. The fluidized bed of ore particles will continuously flow around the nozzle openings and this will result in a particularly advantageous distribution of the reducing agent throughout the entire fluidized bed.

Thus, essentially, the present invention may be carried out in two ways, namely with nozzle openings either spaced above the upper surface of the fluidized bed in the gas filled portion of the furnace space or with the nozzle openings located within the fluidized bed. In both cases, the conduit means and nozzles through which the reducing gas or hydrocarbon oil is fed into the furnace will be stationary and will not turn or rotate together with the furnace. The reducing gas or oil may be blown into the furnace, above or within the fluidized bed, either through openings or holes in the conduit through which the gas or oil is fed into the furnace, or through special nozzle arrangements, such as tubular nozzles which are attached to and communicate with the feed conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1-3 are schematic transverse cross-sectional views of three embodiments of the present invention;

FIG. 4 is a fragmentary cross-sectional view taken in longitudinal direction of a furnace according to the present invention;

FIG. 5 is a transverse cross-sectional view of another embodiment of the present invention; and FIG. 6 is a cross-sectional and a transverse cross-sectional view of the oil and air supply of the furnaces.

In all figures of the drawing identical reference numerals refer to identical members of the structure.

Referring now to the drawing, the inner wall of the rotating or turning furnace is indicated by reference numeral 1, the fluidized bed of ore particles by reference numeral 2, and reference numeral 3 denotes the free gas space above fluidized bed 2.

According to the embodiment illustrated in FIG. 1, the conduit and nozzle arrangement through which reducing gas or a hydrocarbon oil which at the furnace temperature will be cracked under formation of reducing gas, is introduced, is located in gas space 3 above the upper surface of fluidized bed 2. Nozzles 5 are arranged along the lowermost portion or conduit 4, opening in downward direction and upwardly spaced from the upper surface of fluidized bed 2. The stream or jet of gas or hydrocarbon oil which emanates from nozzles 5 will penetrate through the upper surface of fluidized bed 2 and, as indicated in the drawing, will reach the lower portion of inner furnace wall 1. Upon contact with furnace wall 1, the jet of gas will be broken up and will be distributed throughout the fluidized bed. In this connection, it must be remembered that while the nozzle is stationary, furnace wall 1 turns, so that there is a continuous relative movement between the jet of gas, or oil which while passing through the fluidized bed is cracked to form a reducing gas, and the surrounding portions of fluidized bed 2.

According to FIGURE 2, conduit 8 is located within the furnace in a somewhat lower position, i.e., in closer proximity to the upper surface of the fluidized bed, and tubular nozzles 9 extend downwardly into the fluidized bed so that the stream or jet of gas or oil, when emanating from nozzles 9, is immediately surrounded by the fluidized bed.

According to the embodiment illustrated in FIGURE 3, conduit 10 is located even lower, namely so that conduit 10 as well as nozzle arrangement 11 are both at all times located within the fluidized bed maintained within the rotating furnace.

According to all of these embodiments of the present invention, the gas which is blown into the fluidized bed, or the gas which is formed by blowing oil into the fluidized bed will, after passing through the fluidized bed, eventually reach the free gas space above the fluidized bed. In the free gas space, the gas will then be subjected to combustion to the extent to which it still contains combustible constituents and thus will be utilized in connection with producing within the furnace the temperature required for carrying out the process, i.e. a temperature sufficiently high to cause reduction of the ore in contact with the reducing gas.

In FIGURE 4, the inner furnace wall 1 is shown in longitudinal cross section, with the fluidized bed occupying about the lower third of the furnace space. Reference numeral 12 denotes the stationary furnace head in which furnace wall 1 rotates, and within the furnace head the means for withdrawing the reduced ore are schematically indicated.

Reference numeral 8 illustrates the conduit through which reducing gas or hydrocarbon oil is supplied, which conduit is located in approximately the same position as illustrated in FIGURE 2 and which carries tubular nozzles 9 which extend into the lower portion of the fluidized bed in the vicinity of the lower portion of furnace wall 1.

Conduit 8 may be arranged so as to be movable in axial direction of the furnace so that the distance of the tubular nozzles 9 from the furnace head portion 12 can be adjusted as desired.

Nozzle 14 serves for introducing air or combustible material into the gas space of the furnace, so that in the gas space above fluidized bed 2 combustion will take place for the purpose of heating the furnace to the required temperature. Nozzles 14 may also be used for introducing hot gas into the furnace particularly during starting up operation so as to obtain initially the elevated temperature required for the reduction of the ore particles. Reference numeral 13 denotes a member fixed to furnace wall 1 such as a pulley or gear which is driven so as to cause turning or rotating of furnace 1. At the charging end of the furnace a charging device 15 as a feeding worm is partially introduced into the furnace end.

In FIG. 5 a furnace is shown which may be tilted to and fro as indicated by the two arrows. Conduit 8 is located outside the furnace and rigidly attached beneath to the furnace. Tubular nozzles 9 extend through the furnace wall so that the stream of gas or oil is introduced into the fluidized bed.

In FIG. 6 a transverse (above) cross sectional and a cross sectional view of a feeding system is shown, by means of which oil and air can be introduced into the furnaces as they are illustrated in the other figures of the drawings and which is similar to the oil feeding device of FIG. 4. The oil conduit 8 is surrounded by a tubular body so that an annular space or conduit 16 is built up between said tubular body and the conduit 8.

Likewise, the nozzles 9 are surrounded by nozzles 17 of an annular cross section.

Conduit 16 and nozzles 17 serve to the introduction of air or another oxidizing gas to the oil streams coming through the conduit 8 and out of the nozzles 9.

In carrying out the present invention by introducing a hydrocarbon oil which is to be cracked at the furnace temperature so as to form a reducing gas, it has been found that relatively very high temperatures within the fluidized iron ore bed are required in order to achieve a sufficient degree of cracking of the oil which is blown into the fluidized bed, so that the desired reducing effect will be achieved. The temperature required, for cracking of the oil, under these circumstances, is frequently considerably higher than the temperature which is required for reducing the iron ore by reaction with the reducing gas.

According to a preferred embodiment of the present invention, cracking and reducing will be carried out at lower temperatures than those required for cracking oil blown into the fluilized bed, provided that together with the oil a relatively small proportion of an oxidizing gas such as air, steam or carbon dioxide is introduced into the fluidized ore bed. Preferably, the introduction of the oxidizing gas is carried out in such a manner that a conduit for oxidizing gas terminates in the oil nozzle in such a manner that from this nozzle a mixture of oxidizing gas and oil will emanate in the form of a stream or jet either directed downwardly towards the fluidized bed, or—if the nozzle opening is located within the fluidized bed—will be formed within the fluidized bed.

It is particularly advantageous to carry out the cracking of the oil at relatively low temperatures, since the finely particulate iron ore of the fluidized bed, especially when it already has been partially reduced, will tend to sinter at relatively low temperatures such as even below 1,000° C. and such sintered ore particles offer considerable resistance to further reduction. If the cracking of the oil is to be carried out within the fluidized ore bed without the addition of oxidizing gas, then, for instance in a revolving furnace containing a fluidized bed having a height of between 30 and 100 centimeters, temperatures higher than 1,000° for instance about 1,000° are required for cracking of the ore and at such relatively high temperatures a considerable degree of sintering of the ore particles can be observed.

The minimum proportion of the oxidizing gas such as air which is to be blown together with the hydrocarbon oil into the fluidized bed of ore particles depends on the composition of the hydrocarbon oil and on the maximum temperature at which the particular ore may be reduced without sintering.

By using regular fuel oil for reducing a hematite ore containing about 62% iron and having a maximum particle size below 0.5 mm., and by maintaining in the furnace the fluidized bed at a height of about 60 cm. an amount of air equal to 10% of the amount which would be required for complete combustion of the oil was found to reduce the amount of heavy hydrocarbons in the waste gases to below 4% at a reducing temperature of 1,000° C. By admixing 15% air, the proportion of heavy hydrocarbons in the waste gases was found to be below 1%, and by adding 20% air, i.e. 20% of the amount of air required for complete combustion of the hydrocarbon oil, the waste gases were practically free of heavy hydrocarbons. Without using air or any other oxidizing gas for facilitating the cracking of oil, the waste gases were found to contain more than 7% of heavy hydrocarbons when operating at a furnace temperature of 1,000° C. ("heavy hydrocarbons"=heavier than methane $CH_4$).

The foregoing shows that the use of relatively small quantities of air or other suitable oxidizing gases such as steam or carbon dioxide will suffice to cause substantially complete or sufficiently complete cracking or decomposition of the hydrocarbon oil into reducing constituents during introduction of the oil into the fluidized bed having a temperature of about 1,000° C., so that to proceed in this manner, i.e. admixing a small proportion of oxidizing gas to the hydrocarbon oil, will result in a more economical operation than the cracking of the oil in the absence of oxidizing gas.

As indicated further above, the present invention may not only be carried out in revolving furnaces which continuously revolve in one direction, but also in oscillating furnaces which revolve in one direction through between 180° and 360° and which then reverse their direction so as to revolve to and fro, in each direction, for instance, for between about 180° to 360°. In this case, the fluidized bed may be called an oscillating or reciprocally revolving fluidized bed as compared with the rolling fluidized bed which is formed in a revolving furnace turning continuously in one and the same direction.

It is also possible to reduce fluidized ore in a revolving or turning furnace by introducing the gaseous or liquid reducing agents through the furnace wall rather than through the stationary conduit described above.

When it is desired to carry out the process of the present invention in a revolving or turning furnace having an axis inclined to the horizontal, then it is preferred to introduce the reducing agent into the hotter portion of the fluidized bed, i.e. into the portion of the bed which is at a temperature above 600° C. and which will be found in the lower portion of the furnace closer to the head portion thereof through which the reduced material is withdrawn, while in the upper portion of the inclined furnace the fluidized or at least partially fluidized bed is only heated by the counter-currently moving combustion gases.

*Example*

In an inclined rotary kiln an iron ore of the analysis

| | Percent |
|---|---|
| Fe (as $Fe_2O_3$) | 61.5 |
| Fe (as FeO) | 1.8 |
| $SiO_2$ | 2.3 |
| $Al_2O_3$ | 0.9 |
| CaO+MgO | 0.3 |

Remainder volatile matter.

96.5% having grain size of less than 0.5 mm. and 3.5% of more than 0.5 mm. was treated according to this invention with an oil of the following ultimate analysis: C, 85.3%; H, 11.0%; S, 2.5%; $N_2+O_2$, 1.0%. The time of travelling through the kiln was 6½ hours. The reduction ratio in the treated ore was 87% per 1 ton of ore 890 kg. oil were used.

The oil was injected into a 60 cm. high layer of the ore by water cooled nozzles, together with 18% of the quantity of air required for complete combustion of said oil. At the discharge end of the kiln the reduction temperature was at 1020° C.

The gas coming out of the ore layer into the free furnace chamber had a heavy hydrocarbon content between 0 and 1.8%. The gas was burnt with secondary air above the ore layer in order to produce heat.

It will be understood that each of the elements described above, or two or more together, may also find a useful application in other types of ore reducing devices differing from the types described above.

While the invention has been illustrated and described as embodied in a revolving or turning reducing furnace, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for vari-

What is claimed as new and desired to be secured by Letters Patent is:

1. A method of reducing ore, comprising the steps of partly filling a furnace turnable about a substantially horizontal axis with finely subdivided reducible ore particles having a size not exceeding 0.5 mm. so as to form a bed of said ore particles in said furnace; partially fluidizing said bed of reducible ore particles by blowing into the same a stream of reducing agent which within said bed is in gaseous state; and simultaneously turning said furnace about said axis thereby further fluidizing said bed, whereby in said furnace a floating suspension of said particles in said gaseous reducing agent is obtained providing an improved reducing action between said reducing agent in gaseous state and said floating ore particles.

2. A method as set forth in claim 1 and including the step of heating the furnace to an elevated temperature, and wherein said reducing agent blown into the bed of reducible ore particles includes a stream of oil which is cracked and gasified at said elevated temperature to which said furnace is heated so as to form of said oil a reducing agent in gaseous state.

3. A method as set forth in claim 1 wherein said stream of reducing agent is blown from above into said bed of reducible ore particles.

4. A method as set forth in claim 1 wherein said stream of reducing agent is blown into said bed of reducible ore particles from below the surface thereof.

5. A method as set forth in claim 1 including the step of heating said furnace to an elevated temperature, and wherein said stream of reducing agent includes at least one hydrocarbon which is cracked at said elevated temperature in the presence of an oxidizing gas thereby forming a gaseous reducing agent for said ore particles, and an oxidizing gas to form a reducing agent in gaseous state.

6. A method of reducing ore as defined in claim 5 wherein said oxidizing gas is introduced in a quantity equal to less than 25% of the quantity required for complete oxidation of said hydrocarbon.

7. A method as set forth in claim 1 including the step of heating said furnace to an elevated temperature and wherein said stream of reducing agent blown into said bed of ore particles is a mixture of at least one hydrocarbon which is cracked at said elevated temperature in the presence of an oxidizing gas thereby forming a gaseous reducing agent for said ore particles, and of an oxidizing gas selected from the group consisting of air, steam and carbon dioxide so as to form of said hydrocarbon a reducing agent in gaseous state.

8. A method of reducing ore as defined in claim 7 wherein said oxidizing gas is introduced in a quantity equal to between 15 and 20% of the quantity required for complete oxidation of said hydrocarbon.

9. A method as set forth in claim 1 wherein said ore particles are iron ore particles.

10. In a reducing device for reducing ore, in combination, furnace means including a furnace turnable about a substantially horizontal axis; means for forming in said furnace a bed of finely subdivided reducible ore particles; turning means for turning said furnace about its axis; and blowing means extending into said furnace for blowing into the lower portion of said furnace a stream of a fluid reducing agent and a stream of oxidizing gas while simultaneously cooperating with said turning means to fluidize said bed, said blowing means including a first stationary tube extending in axial direction of said furnace, a plurality of first blowing nozzles extending spaced from each other downwardly from said first tube, said first nozzles communicating at the upper ends thereof with said first tube and having lower open ends adapted to extend into the fluidized bed, a second stationary tube surrounding said first tube spaced therefrom, and a plurality of second blowing nozzles respectively surrounding said first blowing nozzles spaced therefrom, said second nozzles communicating at the upper ends thereof with said second tube and having lower open ends downwardly spaced from the open ends of the first nozzles.

References Cited by the Examiner

UNITED STATES PATENTS

| 1,797,130 | 3/1931 | Coley | 75—36 |
| 1,829,438 | 10/1931 | Coley | 75—36 |
| 1,976,162 | 10/1934 | De Buch | 263—33 |
| 2,941,791 | 6/1960 | Wienert | 75—34 |
| 3,053,648 | 9/1962 | Stephens | 75—34 |
| 3,072,469 | 1/1963 | Eastman | 75—34 |

FOREIGN PATENTS

| 118,291 | 3/1947 | Sweden. |

DAVID L. RECK, *Primary Examiner.*

WINSTON A. DOUGLAS, *Examiner.*